(12) United States Patent
Schwöller

(10) Patent No.: US 11,235,884 B2
(45) Date of Patent: Feb. 1, 2022

(54) ELECTRIC DRIVE FOR AN AIRCRAFT AND HYBRID SYSTEM FOR AN AIRCRAFT

(71) Applicant: Johann Schwöller, Strasswalchen (AT)

(72) Inventor: Johann Schwöller, Strasswalchen (AT)

(*) Notice: Subject to any disclaimer, the term of this patent is extended or adjusted under 35 U.S.C. 154(b) by 942 days.

(21) Appl. No.: 15/566,350

(22) PCT Filed: Apr. 15, 2016

(86) PCT No.: PCT/EP2016/058450
§ 371 (c)(1),
(2) Date: Mar. 9, 2018

(87) PCT Pub. No.: WO2016/166344
PCT Pub. Date: Oct. 20, 2016

(65) Prior Publication Data
US 2018/0194483 A1   Jul. 12, 2018

(30) Foreign Application Priority Data

Apr. 15, 2015   (DE) .................. 10 2015 105 787.5

(51) Int. Cl.
*B64D 27/24*   (2006.01)
*B64D 27/02*   (2006.01)
(Continued)

(52) U.S. Cl.
CPC ............. *B64D 27/24* (2013.01); *B64D 27/02* (2013.01); *B64D 31/04* (2013.01); *B64D 35/08* (2013.01);
(Continued)

(58) Field of Classification Search
CPC .. B64D 27/24; B64D 2027/026; B64D 27/00; B64D 27/02; B64D 31/04; B64D 31/08; B64C 2201/042; Y02T 50/60
See application file for complete search history.

(56) References Cited

U.S. PATENT DOCUMENTS 5,188,316 A   2/1993   Dressler et al.
6,242,878 B1   6/2001   Wilson
(Continued)

FOREIGN PATENT DOCUMENTS

DE   9310219 U1   1/1994
DE   19512816 A1   10/1996
(Continued)

OTHER PUBLICATIONS

International Preliminary Report on Patentability, dated Dec. 12, 2017, from International Application No. PCT/EP2016/058450, filed on Apr. 15, 2016. 22 pages.
(Continued)

*Primary Examiner* — Assres H Woldemaryam
*Assistant Examiner* — Aaron M Rodziwicz
(74) *Attorney, Agent, or Firm* — HoustonHogle LLP

(57) ABSTRACT

The invention relates to an electric drive for an aircraft hybrid system. This electric drive comprises a rotor and a stator, wherein the stator may be connected to a structure of the aircraft and the rotor has an annular flange with a shaft through opening for mounting on a propeller flange, wherein the flange is formed of at least two parts, wherein each of these parts of the flange delimits a section of the shaft through opening.

18 Claims, 14 Drawing Sheets

(51) Int. Cl.
*B64D 31/04* (2006.01)
*B64D 35/08* (2006.01)

(52) U.S. Cl.
CPC .. *B64C 2201/042* (2013.01); *B64D 2027/026* (2013.01); *Y02T 50/60* (2013.01)

(56) References Cited

U.S. PATENT DOCUMENTS

| | | | |
|---|---|---|---|
| 6,550,719 B2 | 4/2003 | Konig | |
| 6,561,336 B1* | 5/2003 | Huart | B60K 6/26 192/70.252 |
| 8,336,814 B2 | 12/2012 | Reinhardt | |
| 2010/0186418 A1* | 7/2010 | Beutin | F02K 3/072 60/802 |
| 2011/0167835 A1* | 7/2011 | Beutin | F02C 7/32 60/802 |
| 2011/0281679 A1* | 11/2011 | Larrabee | B64D 35/08 475/5 |
| 2013/0086919 A1* | 4/2013 | Dooley | F01D 15/10 60/778 |
| 2013/0190949 A1 | 7/2013 | Constans et al. | |
| 2013/0227950 A1* | 9/2013 | Anderson | B64D 27/24 60/718 |
| 2014/0010652 A1* | 1/2014 | Suntharalingam | B64D 35/08 416/1 |
| 2014/0346280 A1 | 11/2014 | Constans et al. | |
| 2016/0221674 A1* | 8/2016 | Latham | B64C 27/68 |
| 2017/0088283 A1* | 3/2017 | Mittermaier | B64D 27/02 |
| 2017/0260872 A1* | 9/2017 | Munevar | F01D 21/006 |
| 2018/0118364 A1* | 5/2018 | Golshany | F02C 6/06 |

FOREIGN PATENT DOCUMENTS

| | | | |
|---|---|---|---|
| DE | 19828720 A1 | 12/1999 | |
| DE | 10040577 A1 | 3/2002 | |
| DE | 69811422 T2 | 10/2003 | |
| DE | 102007017332 A1 | 10/2008 | |
| DE | 202008015201 U1 | 3/2009 | |
| DE | 202013001622 U1 | 4/2013 | |
| DE | 102013102194 A1 | 9/2014 | |
| DE | 102013209388 A1 | 11/2014 | |
| EP | 2413483 A1 * | 2/2012 | ............ B64D 27/24 |
| EP | 2688184 A1 * | 1/2014 | ............ H02K 7/006 |
| GB | 2465284 B | 5/2014 | |
| JP | 2015110413 A * | 6/2015 | ............ B64C 27/48 |
| WO | WO-2008086774 A2 * | 7/2008 | ............ B64D 35/00 |
| WO | WO-2010029113 * | 9/2009 | |
| WO | WO-2010029113 A2 * | 3/2010 | ............ H02K 1/187 |
| WO | WO-2011127389 A2 * | 10/2011 | ............ B64D 27/04 |
| WO | WO-2012035178 A1 * | 3/2012 | ............ B64D 27/02 |
| WO | WO-2012144907 A1 * | 10/2012 | ............ B64D 27/20 |
| WO | WO-2016049030 A1 * | 3/2016 | ............ B60K 6/20 |

OTHER PUBLICATIONS

International Search Report, dated Sep. 12, 2016, from International Application No. PCT/EP2016/058450, filed on Apr. 15, 2016. 7 pages.

* cited by examiner

Fig. 1

ELECTRIC DRIVE FOR AN AIRCRAFT AND HYBRID SYSTEM FOR AN AIRCRAFT

RELATED APPLICATIONS

This application is a § 371 National Phase Application of International Application No. PCT/EP2016/058450, filed on Apr. 15, 2016, now International Publication No. WO 2016/166344, published on Oct. 20, 2016, which International Application claims priority to German Application 10 2015 105 787.5, filed on Apr. 15, 2015, both of which are incorporated herein by reference in their entirety.

The present invention relates to an electric drive for an aircraft and a hybrid system for an aircraft.

Described in DE 10 2007 017 332 A1 is an aircraft with an internal-combustion engine, the drive power of which may be used to drive a propeller. The internal-combustion engine acts in conjunction with an electrical machine which may be operated in a first operating mode as an electric motor and in a second operating mode as an electrical generator.

Aircraft are generally powered by an internal-combustion engine. In certain phases of flight, these internal-combustion engines are driven at increased power. This surplus power is needed for example when starting the aircraft or in the safety-critical climbing phase following the start. Here the internal-combustion engine is generally operated at especially high speed and loading, resulting in disproportionately increased wear.

Also known are aircraft which are powered by an electric motor. Disclosed in DE 195 12 816 A1 for example is a glider with auxiliary motor in the form of an electric motor. The power supply of the electric motor is ensured by a battery facility provided in the wings.

In U.S. 2014/0346280 A1, U.S. 2013/0190949 A1, DE 69811422 Part 2 and U.S. Pat. No. 5,188,316 A, systems for the power control of aircraft are disclosed.

DE 10 2013 209 388 A1, DE 10 2013 102 194 A1 and DE 10 2007 017 332 A1 disclose hybrid drives for aircraft.

To date, in order to provide increased drive power for conventional aircraft, internal-combustion engines with greater power have been used. However, the resultant increase in weight leads to greater demands on the aircraft structure and consequently a higher overall weight plus increased fuel consumption in cruising flight.

The problem of the present invention is therefore to provide an electric drive for an aircraft which makes more power available to the aircraft, has a simple construction, and is easily fitted, in particular retrofitted.

A further problem is to provide a hybrid system for an aircraft which is efficient and of simple design.

These problems are solved by an electric drive for an aircraft according to claim 1, and by a hybrid system for an aircraft according to claim 4. Advantageous developments are set out in the relevant dependent claims.

According to the invention, an electric drive for an aircraft hybrid system is provided. This electric drive includes a rotor and a stator, wherein the stator may be connected to a structure of the aircraft and the rotor has an annular flange with a shaft through opening for mounting on a propeller flange, wherein the flange is formed of at least two parts, wherein each of these parts of the flange delimits a section of the shaft through opening.

A structure of an aircraft is understood to mean e.g. a motor or gear housing or components thereof. In particular it means an immovable, i.e. static component of an aircraft.

The electric drive according to the invention therefore offers the advantage that the propeller of an aircraft may be driven directly, thereby making the drive less prone to wear, since the electric drive may be mounted directly behind the propeller flange and connectable to it.

In particular it is advantageous, since the flange is in at least two parts, that neither the propeller flange nor any other gear or motor component must be dismantled in order to install the electric drive according to the invention and therefore retrofit an aircraft. It is enough simply to remove the propeller and to fit the electric drive according to the invention on to the propeller flange.

The rotor with the surrounding permanent magnets is at the same time connected directly to the propeller flange, and thus transfers the torque of the electric motor directly to the propeller.

One end face of the flange is described as the propeller side and another end face as the motor side, wherein a roughly tubular bearing housing section may be formed on the motor side and a roughly tubular rotor bearing section may be formed on the propeller side.

The stator may have an annular bearing device and a torque support, wherein the bearing device may be provided in the area of the bearing housing section of the two-part annular flange and the rotor may be fixed on the rotor bearing section of the mounting flange.

The stator is mounted rotatably via the bearing device, e.g. a roller bearing, and the flange which is in at least two parts. The reaction torque of the stator is delivered via the torque support to an engine housing or an engine bearer, where it is absorbed.

Due to the fact that the electric drive according to the invention has an annular flange which is in at least two parts, it is now possible to install the electric motor direct, i.e. without removal of other components except for the propeller, at the rear of the propeller flange, to the front of which the propeller is then re-attached.

Conventional electric motors and their "shaft through opening" are intrinsically smaller than a propeller flange. It is therefore necessary to remove the internal-combustion engine and/or its gear components in order to install the electric motor behind the propeller flange.

The stator of the electric drive according to the invention, which holds the magnet windings, has an annular bearing device which has a larger inside diameter or a greater shaft through opening than the propeller flange. By this means, with the propeller removed, the stator together with the bearing device may be slid over the propeller flange from the propeller side.

So that the stator may now be fastened to the propeller flange from the rear side, the annular flange with at least two parts is provided.

The two-part flange is inserted between the propeller flange and the stator and slid into the bearing device, e.g. a suitably dimensioned roller bearing.

In this way the bearing device undertakes the centering and the putting together of the at least two-part flange.

The stator and flange are then attached to the front of the propeller flange.

The rotor of the electric drive with permanent magnets arranged all around may now be slid over the propeller flange in a similar manner and connected to the at least two-part flange, for example, by means of screw connections.

By means of the electric drive for an aircraft, according to the invention, it is possible in certain flight situations, e.g.

during starting, to provide more engine power for a short time for the ascent phase or in aerobatics.

It is also possible, through the electric drive, to shorten the takeoff taxiways. In order to be certain of overcoming obstacles directly after starting or in flight, the minimum safe flight altitude may be reached more quickly, and in particular there is more engine power available for climbing phases in aerobatics.

From the prior art it is known to provide this additionally required engine power by means of a more powerful, larger and therefore also heavier internal-combustion engine. This has the drawback that, in normal cruise flight, such a larger internal-combustion engine is operated in the lower, more inefficient part-load range. This means that such an internal-combustion engine is then not used at the optimal operating point for most of the flying time. As a result, efficiency falls and the specific consumption values of the internal-combustion engine rise.

Through the provision of an electric drive according to the invention it is possible for aircraft which require increased engine power to use a conventional small, lightweight and efficient internal-combustion engine, which can be worked during cruise flight at its optimal operating point.

The additional power required in the situations described above is provided by the electric drive according to the invention.

Since the power is needed only for a short time, a suitable electrical energy store, e.g. a battery, may be very small and light.

In this connection it is provided that, in long-haul flight, the internal-combustion engine runs at approximately its optimal operating point, i.e. 85% of its power. During starting or in the climbing phase, also in short aerobatic phases it is then provided that the engine gives out 100% of its power. The additional power demand is then provided by the electric drive according to the invention.

In addition, according to the invention, a cup-shaped centering device may be provided.

On the rear side of the propeller flange, there are generally no centering surfaces provided, which might be used for centering an electric motor relative to the propeller flange.

It is therefore provided that, from the front, the cup-shaped centering device is placed on an existing spigot of a propeller flange. This spigot then undertakes additionally the centering of the at least two-part flange according to the invention, and therefore of the whole electric drive.

Moreover, the centering device has drilled holes for mounting means such as for example screw connections, which assist the holding together of the at least two-part flange, since the centering device may be provided above the flange.

Finally the entire electric drive is screwed by means of the propeller mounting screws via the centering device through the propeller flange to the at least two-part flange.

Consequently the electric drive according to the invention for an aircraft hybrid system may be mounted in a simple manner exactly behind the propeller flange, without the need to remove any components of the internal-combustion engine or the gearing.

Here the propeller flange serves at the same time as support for the electric motor.

The reaction torque of the stator is transferred by a torque support of the stator for example to the engine housing of the internal-combustion engine or to other engine mounting components.

Thus there is also no costly construction necessary for mounting or holding the electric motor, since this is undertaken by the propeller flange via the bearing device in the stator.

Furthermore, according to the invention, a hybrid system for an aircraft is provided. The hybrid system includes a propeller shaft with propeller flange, an electric drive according to the invention, which is connected to the propeller flange, together with an internal-combustion engine with crankshaft, wherein the propeller shaft may be driven via the crankshaft of the internal-combustion engine.

By means of such a hybrid system, the advantages described above are obtained.

A gearbox may be provided to change the transmitted force or the transmitted torque from the engine to the propeller.

It may also be provided according to the invention that the crankshaft of the internal-combustion engine is connected to the propeller shaft via a clutch.

In the case of aircraft it is normally provided that the internal-combustion engine drives the propeller directly or via an interposed propeller gearbox.

Due to the provision of a clutch between crankshaft and propeller shaft and in particular between propeller gearbox and propeller shaft, the power transmission from the internal-combustion engine to the propeller may be interrupted, so that the propeller can be driven solely by the electric drive. Such a separation offers considerable advantages in the operation of an aircraft.

Many airfields have to fight noise problems from starting aircraft. While ultra-lightweight and light aircraft are quieter than normal powered aircraft, residents often feel harassed by the associated noise.

Through provision of the clutch between internal-combustion engine and propeller, the electric drive according to the invention may be used to start the aircraft with electrical power alone, and therefore almost without noise.

In this connection it is provided that the changeover to operation with the internal-combustion engine is made at a certain flight altitude or following the ascent phase.

The electric drive according to the invention also offers enhanced reliability for aircraft.

If the internal-combustion engine fails because of a technical problem or due to lack of fuel, there is a sudden loss of engine power. The pilot is then forced to find a suitable landing site very quickly.

By uncoupling the internal-combustion engine from the propeller, i.e. by opening the clutch, the pilot can use the full power of the electric motor, since the latter is decoupled from the crankshaft of the internal-combustion engine and does not need to drive it.

This is due in particular to the fact that the electric drive is connected directly to the propeller flange.

Depending on battery capacity, the pilot now has significantly more time for an emergency landing, or he has if applicable even sufficient reserves to be able to reach the next airfield, In the case of known and in particular frequently used aircraft engines, for example from the firm Rotax, a friction clutch is often provided, to protect the engine from damage if the propeller touches the ground.

This clutch may, according to the invention, be replaced by a mechanically or hydraulically actuable clutch which fulfils both the function of a friction clutch and/or allows the decoupling of crankshaft and propeller shaft.

According to a further aspect of the present invention, one wheel or preferably at least two of the wheels of the aircraft undercarriage may be provided with an electric drive, e.g. a wheel hub motor.

By this means it is possible to save energy in the acceleration phase on the take-off runway, since the efficiency of such wheel hub drives for moving an aircraft on the runway is much greater than realizing the running process using the propeller.

Here it is provided that, during taxiing and acceleration, only so much power is switched to the electric motor for the propeller drive that the latter is not braked, but instead generates a slight thrust.

The major part of the electrical power available is fed to the electric drives of the wheels, which are preferably located in the main wheels of the undercarriage.

With increasing rolling speed, the propeller speed is increased. Only shortly before lift-off is significantly more power then fed to the propeller. As soon as the wheels lose contact with the ground, they suddenly rotate faster. The electronics register this by means of suitable sensors, for example by means of suitable speed sensors, and switch off the electric motors of the wheels. Full power is then given to the electric motor driving the propeller.

It is also possible to provide a power control unit for the wheels, which is in the form of an anti-slip controller. By means of this power control unit, the drive power delivered to the wheels may be limited in such a way that power is automatically reduced as soon as the slip between a peripheral speed of a wheel and the ground exceeds a certain limit.

The ratio between the wheel peripheral speed and the ground may be determined by a comparison with the other wheels of the undercarriage, as for a motor vehicle. An option for clear determination even on wet or slippery ground is to provide a photographic sensor system which calculates the speed at which the ground moves away beneath the aircraft through continuous image taking and analysis.

The drive power which cannot be used by the wheels because of slippage, can be transferred directly to the propeller, so that the latter is operated with more power. I.e. increasing wheel-slip as the aircraft which becomes increasingly lighter during starting and the associated lighter contact pressure of the wheels on the ground is thereby limited automatically to a settable maximum. Surplus battery power may be transmitted to the propeller.

On reaching a suitable flight altitude, the pilot can switch over to the internal-combustion engine. The clutch, which has separated the internal-combustion engine from the propeller shaft, is then closed and the ignition correspondingly switched on.

In this way the internal-combustion engine is set in rotation and started up. The electronics detect this additional power provided by the internal-combustion engine and switch off the electric drive.

It is also possible according to the invention to provide a safety circuit for the ignition, which prevents any over-revving of the internal-combustion engine without load, so long as the clutch is open.

According to a further aspect of the present invention, a coupling element is provided to connect a power lever side control connection and a motor side control connection of a hybrid system. This includes an adjusting device or servo unit to actuate a motor side control connection, a reset device to reset the servo unit to an original position, so that in the event of a fault or a deactivation of the hybrid system, there is always a direct connection between the power lever side control connection and the motor side control connection. The mechanical motion transmission device to link a power lever side control connection and the servo unit is so designed that, in the event of a change in the power lever position in pure internal-combustion operation, the direct connection with the motor side control remains intact.

The servo unit may be capable of activation in such a way that, with a power lever side removal of gas, the motor side control connection may be adjusted into a higher gas position, so that the surplus energy of the internal-combustion engine may be fed via the crankshaft and supplied to a battery at an electric motor, which now acts as generator.

The motion transmission device may be a sliding carriage or a rotary element such as e.g. a rotary disc.

According to a further aspect of the present invention, a power control system is provided, in particular for an aircraft hybrid system according to the invention. This includes a coupling element, a motor sensor to detect the position of the motor side control connection, and a power sensor to detect the position of the power lever side control connection.

The power control system may also include a power lever device according to the invention, which will be described in detail below.

This power control system includes a coupling element according to the invention with a motion transmission device for connection with a power lever side control connection and a servo unit for actuation of a motor side control connection.

The coupling element is able to effect an increase of power of the internal-combustion engine, even though the power lever would require less power from the internal-combustion engine.

It is possible to provide a mechanical reset device to reset the servo unit into an original position, to ensure a reliable mechanical connection in the event of a fault or if the hybrid drive is switched off.

Due to the fact that the coupling element has a mechanical reset device, it is ensured that the servo unit is reset without the influence of a control device or in the event of a power failure, so that a direct connection between power lever and internal-combustion engine is ensured, i.e. the power lever always has a direct connection with the control of the motor power in the event of a fault.

The motion transmission device may be a sliding carriage or a rotary disc or another element able to effect an increase in the power requirement via the motor side control connection, with reference to the power lever side control connection.

In addition, a motor sensor may be provided to detect the position of the motor side control connection. By means of the motor sensor, the position of the motor side control connection is detected and transmitted to the control system.

The control connections may be e.g. in the form of a linkage or a control cable.

On activation of the electric drive according to the invention, the position of the power lever is transmitted via the motion transmission device (sliding carriage, rotary disc or the like). The motor side control connection is then set by the servo unit in such a way that the power of the internal-combustion engine may be increased by means of a suitable carburetor setting.

In addition, a power sensor may be provided to detect the position of the power lever, which detects the position of the power lever side control connection. In this way, on activation of the electric drive according to the invention, the position of the power lever is detected by means of the power lever sensor and passed on to the control unit.

This power sensor may moreover transmit to the power control system a signal with information about required electrical power and/or a required braking power or function of the electric motor in a generator operation.

The motor side control connection is then set by the servo unit in such a way that the power of the internal-combustion engine may be increased by means of a suitable carburetor setting.

A reduction in power is ruled out mechanically for both embodiments, so that it is not possible for the pilot, in the event of a breakdown, to have at his disposal less than the power preset by the power lever.

On withdrawal of power via the power lever, the electronics may still allow the internal-combustion engine to run with higher power, i.e. at the optimal operating point The surplus energy is here delivered via the crankshaft to the electric motor, which now acts as generator, and fed to a suitable battery.

When the battery is fully charged, the motor power returns to the power desired by the pilot, since the servo unit reduces this and simultaneously switches off the charging function from the generator to the battery.

In the event of a fault or emergency shutdown the power supply to the servo unit or to the whole hybrid control may be interrupted, so that the latter no longer has any function. Here in particular, a brushless motor actuator may be provided, since this is especially easy to move.

By means of the reset device, the servo unit is brought into an end position, thereby ensuring a direct connection between the power lever and the internal-combustion engine. The pilot is therefore able once more to control the internal-combustion engine directly, i.e. without the power control system according to the invention.

Also provided, according to the invention, is a power lever device for an aircraft hybrid system, in particular an aircraft hybrid system according to the present invention. This comprises a power lever which may be moved between a neutral position and a full throttle setting of the internal-combustion engine. On reaching the full throttle setting, the resistance of a release device has to be overcome so that, if the full throttle setting of the internal-combustion engine is exceeded, an electric drive may be switched on in addition, up to the full power of the hybrid system.

By means of such a power lever device, the additional electric motor power may be called up in addition to the 100% or full power of the internal-combustion engine.

To ensure that, during flight, the electrical power of the electric drive is not called upon unintentionally, the resistance of the release device must be overcome. This resistance may be provided by a spring force, or also by a release button which has to be activated.

This release function of the power lever prevents accidental switch-on of the electric drive and discharge of the battery during flight.

In addition, the power lever device according to the invention may include at the front end point a switch which is able to trigger the immediate starting of the internal-combustion engine.

According to a further aspect, the power lever device for an aircraft hybrid system includes a power lever, which, in a purely electric operating mode of the system, forms a braking area for braking a propeller, wherein in this braking area the electric motor acts as generator so that a propeller may be braked.

The braking area may be formed in a lower power lever section in the area between the neutral position and the full throttle setting of the internal-combustion engine, or in the area behind the neutral position of the internal-combustion engine.

In purely electric operation, i.e. with the internal-combustion engine switched off and the clutch connection between internal-combustion engine and propeller open, the power lever may be used in the braking area to switch the electric motor into generator operation. In descent or landing approach, the motor operated as generator may be used for braking the propeller, in that the power produced in the generator is used to charge the battery. If the battery is already fully charged, then the power can be discharged via a load resistor which converts the surplus power into heat.

This thermal energy cannot be used with the battery fully charged. The dissipation of the energy via the load resistor is provided for braking the propeller, so that the aircraft can descend more quickly.

By this means, the internal-combustion engine may be switched off completely during descent or landing approach, since any required braking power may be provided by a delivery of power to the generator and/or the battery or the load resistor.

In this way it is possible to have an almost soundless landing approach and, associated with this, a significant reduction in noise.

If the internal-combustion engine is required again, a changeover to the internal-combustion engine may be made at any time, as described above with the aid of the starting process after a purely electrical start.

Since the power lever is placed in the front end position to call up the maximum power of the overall system, the internal-combustion engine may be used at any time. The internal-combustion engine is then started automatically. In addition, the electrical power is available. This may be effected by a type of "kick-down" switch at the front stop of the power lever.

This may be of benefit e.g. when going around or on a landing strip, since the power of the internal-combustion engine and of the electric drive are available for the going around without the need, in this situation, for removal of the hand from the power lever and actuation of an internal-combustion engine activation button on the instrument panel.

The apparatus according to the invention is explained in detail below with the aid of the Figures, which show in:

FIG. 1 a propeller flange, a two-part annular flange, a stator with bearing device, in a perspective view FIG. 2 the view of FIG. 1 with two-part flange inserted in the bearing device of the stator, in a perspective view FIG. 3 the view of FIG. 2 with stator, bearing device and flange moved closer to the propeller flange FIG. 4 the view of FIG. 3 with centering device FIG. 5 the view of FIG. 4 with rotor FIG. 6 a side sectional view of a coupling element for a hybrid system FIG. 7 a schematic view of the structure of a power control according to the invention FIG. 8 a schematic view of the structure of a further embodiment of a power control according to the invention FIG. 9 a power lever device according to the invention in a schematic view in which the braking area lies behind a neutral position or a power section of the internal-combustion engine FIG. 10 a power lever device according to the invention in a schematic view, in which the braking area lies in the lower power section of the internal-combustion engine FIG. 11 a hybrid drive according to the invention in a side section view FIG. 12 a general view including the power lever device of FIG. 9, a power control system, a coupling element, a power lever side control connection, a motor side control connection and a throttle valve FIG. 13 a general view including the power lever device of FIG. 10, the power control system, the coupling element, the power lever side control connection, the motor side control connection and a throttle valve, FIG. 14 shows the general view of FIG. 13, in which the power requirement on the part of the power lever is withdrawn and the servo unit of the coupling element increases the power requirement at the internal-combustion engine through twisting of the lever.

The structure of an electric drive 1 according to the invention for an aircraft hybrid system is described below (FIGS. 1 to 5 and FIGS. 6 and 11). This includes a flange 2, a stator 13 and a rotor 17.

The flange 2 is at least two-part and annular. An end face of the flange 2 running transversely to the axial direction 3 is described as the propeller side 4, and another end face of the flange 2 is designated as the motor side 5.

A tubular bearing housing section 6 is formed on a motor side 5 on the annular flange 2.

Formed on the propeller side 4 is a roughly tubular rotor bearing section 7.

A web extending radially outwards between bearing housing section 6 and rotor bearing section 7 forms a mounting section 9 and has radially continuous through holes 8, spaced equally apart from one another.

A web which extends radially inwards forms a mounting section 11 and has similarly radially continuous through holes 10, spaced equally apart from one another. Through these through holes 10, the flange may be connected to a propeller flange 12 of an aircraft.

The electric drive 1 also includes the stator 13. The stator 13, in which the electrical magnet windings are accommodated, has in the center an annular bearing device 14 with a shaft through opening 31, wherein the bearing device 14 is e.g. in the form of a roller bearing.

A torque support 15 is also provided on the stator 13.

The bearing device of the stator 13 may be mounted on a jacket wall 16 of the bearing housing section 6. In order to prevent slipping of the bearing device 14 on the bearing housing section 6, known means 38 for fixing components on shafts in the axial direction, such as a circlip or the like, are provided.

FIG. 11 shows by way of example such an axial fixing device 38 using a ring flange 38, which fixes the bearing device 14 on the bearing housing section 6 in the axial direction. Alternatively, one or more ring segments may also be provided.

The electric drive also has a rotor 17, which may be mounted on a jacket wall of the rotor bearing section 7.

A cup-shaped centering device 18 is inserted in an annular gap 19 formed between rotor 17 and flange 2.

Consequently, the flange 2 and the stator 13 are mounted on a motor side of the propeller flange 12.

On a rotor side of the propeller flange 12, the rotor 17 and the centering device 18 are mounted.

The rotor 17 is connected to the flange 2 via the through holes 10 formed in the mounting section 11.

Propeller screws for fixing a propeller in suitable through holes 10 formed in the propeller flange 12 join a propeller (not shown) to the centering device 18, the propeller flange 12 and the flange 2.

According to an alternative embodiment of the flange 2, the latter may also be formed in three, four or more parts. Advantageously the individual circular-segment-shaped sections of such a multi-part flange 2 are of equal size.

An aircraft hybrid system according to the invention is described below.

A drive of a known aircraft includes an internal-combustion engine with a crankshaft, wherein the crankshaft is connected to a propeller shaft via a propeller gearbox.

The propeller shaft has on the free end a propeller flange, on which a propeller is mounted.

An aircraft hybrid system according to the invention is formed by attaching to the propeller flange the electric drive 1 according to the invention as described above.

According to an advantageous embodiment of the aircraft hybrid system, a clutch is provided between the propeller gearbox and the propeller shaft (FIG. 7).

By means of the clutch, the whole gearbox mechanism of the propeller gearbox of the internal-combustion engine may be decoupled from the propeller shaft, so that the propeller may be driven alone or via the electric drive according to the invention.

Alternatively, the drive may also be designed without a propeller gearbox.

In the case of such a direct drive of the propeller flange via the crankshaft, a clutch may be provided in the area of the connection between crankshaft and propeller flange.

Located in the cockpit of known aircraft is a power lever, which the pilot is able to bring into a predetermined angular position, depending on the desired engine power. Such a power lever is connected via a control connection to a carburetor or to the injector (or throttle valve) of an internal-combustion engine.

The control connection is so designed that, depending on the position of the power lever, the operation of the internal-combustion engine is controlled by control of the carburetor or the injector (or throttle valve).

Activation of the control connection may also be assisted or controlled by a control unit.

A connection between power lever and braking or carburetor setting or injector of the aircraft is therefore designed as the control connection 20.

Described below is a power control system 21 for integration in the control connection 20 between a power lever 22 and the internal-combustion engine of an aircraft (FIGS. 7, 8, 10 and 11 to 14).

The control connection 20 includes a power lever side control connection section 28 and a motor side control connection section 29.

The power control system 21 provides a coupling element 23 to connect the power lever side and a motor side control connection 28, 29 between the power lever 22 and the internal-combustion engine.

The coupling element 23 has a mechanical release device 24, which is in the form of a linear spring or a coil spring or similar. The release device 24 acts with a mechanical force on the power lever 22 of the control element 27 in such a way that the latter is pressed against a stop device 39.

By means of the release device 24 it is ensured that, in the event of a fault, a direct connection between power lever and internal-combustion engine is always guaranteed i.e. that, in the event of a breakdown or with the hybrid system switched off, the power lever always has a direct link with the motor power control unit. The coupling element 23 includes a motion transmission device 32, 33, such as e.g. a sliding carriage 32 (FIG. 7) or a rotary disc 33 (FIG. 8), which is connected to the power lever side control connection and transmits its movement. In addition the coupling element 23 has a servo unit 27, e.g. a servomotor, which is connected to the motion transmission device 32, 33 and which actuates the motor side control connection 29.

The servo unit 27 may also be in the form of a linear drive instead of a lever.

Provided at the motor side control connection between coupling element 23 and internal-combustion engine is a motor sensor 26 to detect the position of the motor side control connection 29.

Similarly, on the power lever side control connection between power lever 22 and coupling element 23 it is also possible to provide a power lever sensor 25 to detect the position of the power lever 22. However, this sensor is not absolutely essential.

The servo unit 27 controls the motor side control connection 29 in such a way that the motor power may be controlled and in particular may be increased above the power requirement preset by the pilot through the power lever.

The servo unit 27, e.g. a servomotor or a motor actuator, is provided for actuating the motor side control connection 29 and is positioned between coupling element 23 and motor.

A power lever device 30 according to the invention will be described below.

Also provided according to the invention is a power lever device 30. This includes a power lever which may be moved between a neutral position 35 and a full throttle setting 36 of the internal-combustion engine (FIGS. 9, 10). On reaching the full throttle position, the resistance of a release device 34 needs to be overcome so that, when the full throttle setting 36 of the internal-combustion engine is exceeded, the electric drive may be added up to the full power of the hybrid system 37.

In the middle lever travel range, the power between neutral position 35 and full throttle setting 36 of the internal-combustion engine may be controlled and called up. After overcoming the resistance of the release device 34, in a lever travel range of the electric drive 36 to 37 before the lever travel range of the internal-combustion engine 35 to 36, the power of the electric motor may be called up additionally (FIGS. 9, 10, 12, 13, 14).

Also provided is an activation device (not shown) for purely electric operation of the system. The activation device may be e.g. a suitable switch in the cockpit.

For such purely electrical operation of the system, there may be provided in the lower power lever range a braking area 42 to 43 of the electric motor or a lever travel range for braking the propeller 42 to 43. Within this range, the electric motor may be activated in generator mode to brake the propeller in descent or landing approach. By this means, the kinetic energy of descent is absorbed and/or the aircraft is braked and/or a steeper descent may be made.

In the lower power range, therefore, after overcoming a release device, the braking power of the electric motor may be accessed. The braking function of the electric motor may thus be used in addition to the braking power of the internal-combustion engine. The braking power is however obtained from the hybrid system in such a way that it does not result in stalling of the internal-combustion engine due to excessively strong braking.

FIG. 10 shows a hybrid power lever according to the invention in which, in the lower control range, the braking function already lies in the lever range of the internal-combustion engine. This is possible because, in this variant, the braking function of the electric motor is activated only with the internal-combustion engine switched off. The neutral position for the internal combustion engine 35 here corresponds to a full braking power position 43 of the electric drive 1 in generator mode. In the area between neutral position 35 and full throttle setting 36 of the internal-combustion engine, a lever position zero braking power 42 is provided.

This braking area may therefore be provided in the area of the lower internal-combustion engine control range (FIG. 10) or alternatively below the neutral point 35 of the internal-combustion engine (FIG. 9). Here the neutral position of the internal-combustion engine 35 corresponds to a zero braking power 42 of the electric drive 1 in generator mode. Located in the area behind the full throttle setting 36 of the internal-combustion engine is a new lever position, namely full braking power 43.

In combined internal-combustion engine/electric motor operation, the internal-combustion engine power may be controlled in a lower section of the power lever between idling internal combustion engine 35 and internal-combustion engine full throttle setting 36. In an upper power lever area between neutral electric drive 36 and full throttle electric drive 37, the electric motor power which is also available may be accessed and controlled.

To switch over from combined electric motor/internal-combustion engine operation to purely electric operation, the activation device is actuated by the pilot. The ignition of the internal-combustion engine together with the injection is then switched off. The clutch is then opened, which separates the connection between the internal-combustion engine and the propeller. The internal-combustion engine is then switched off.

In this purely electric motor operation, in the front power range between neutral electric drive 36 and full throttle electric drive 37, the power of the electric motor may be set by the position of the power lever 22.

In the middle power lever range 35 to 36 (normally provided for the internal-combustion engine), no power is available from the internal-combustion engine, since it is switched off.

In the braking area 42 to 43 or in the lower power lever range, the braking power of the electric motor may be activated by pulling back the power lever 22. The further back the power lever 22 is pulled, the higher the braking power of the electric motor.

To go around with an aircraft, a changeover is made back from purely electric operation to combined electric/internal-combustion engine operation.

In order to switch to combined electric/internal-combustion engine operation on the ground or in flight, two options are provided for starting the internal-combustion engine:
1. by activating a switch provided for this purpose, e.g. a "fly-with-fuel" button in the area of the engine control on the cockpit panel;
2. by a start switch 40 on the power lever as described below.

A switch 40 may be provided on the front stop of the power lever 22. If the power lever is pressed against this switch, against resistance, or if the pilot operates the switch provided for this purpose in the area of the engine control, then the system triggers start-up of the internal-combustion engine.

The clutch which is held open in electric motor operation is closed, causing the internal-combustion engine to be turned by the electric motor and the propeller. Ignition and injection are then activated. This starts the internal-combustion engine, so that the power of the latter is now available in addition to that of the already running electric motor.

If in the landing approach or on touching the landing strip, it is necessary to go around, then the power lever may be pushed completely forwards on to the upper stop of the power control of the electric motor, where the starting of the internal-combustion engine is activated. By this means, in addition to the full power of the electric motor, the power of the internal-combustion engine is also available for going around.

FIGS. 12 and 13 show the differently arranged braking areas, wherein the braking area may also be between these two areas.

Figure 2:
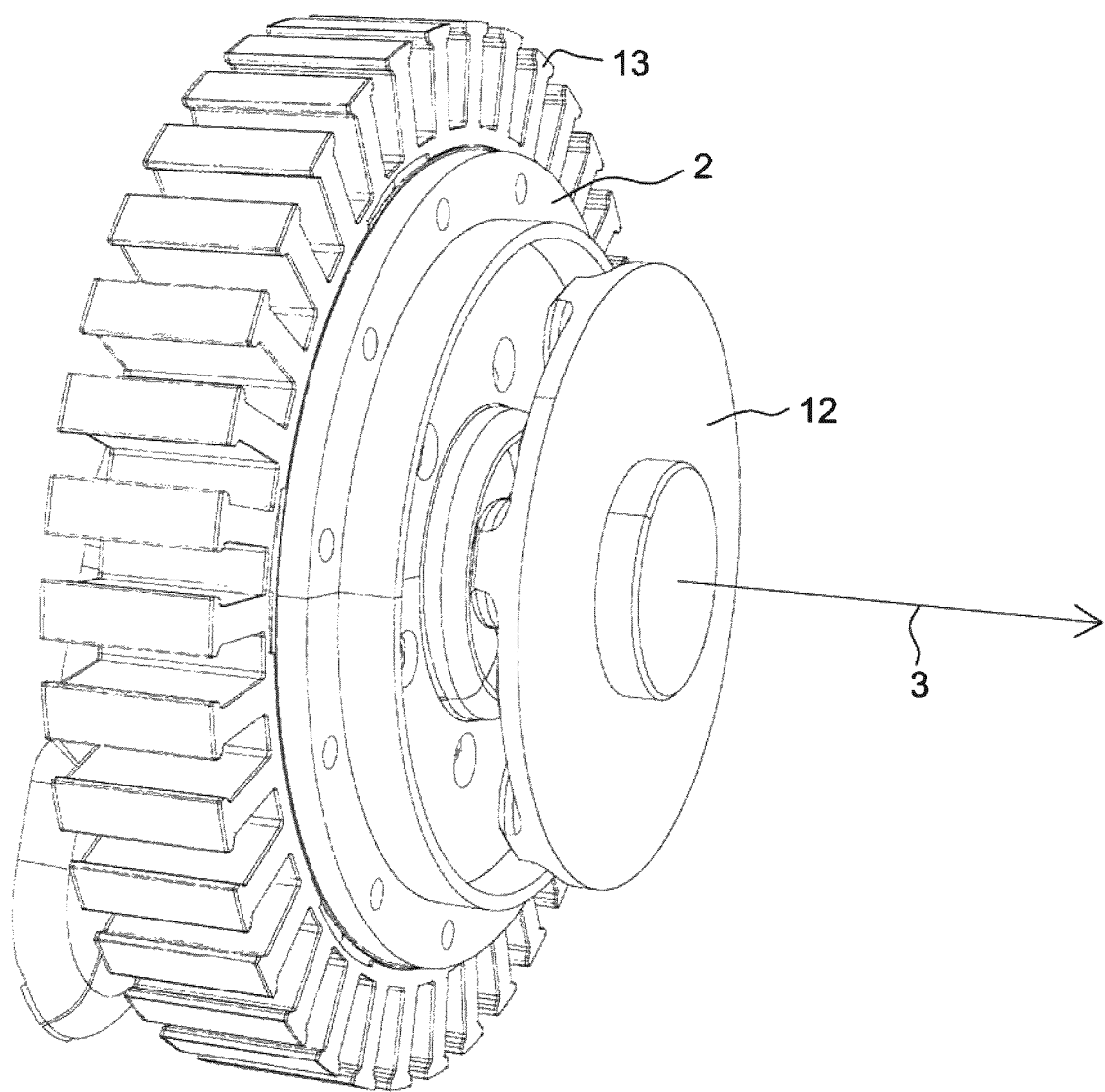
Figure 3:
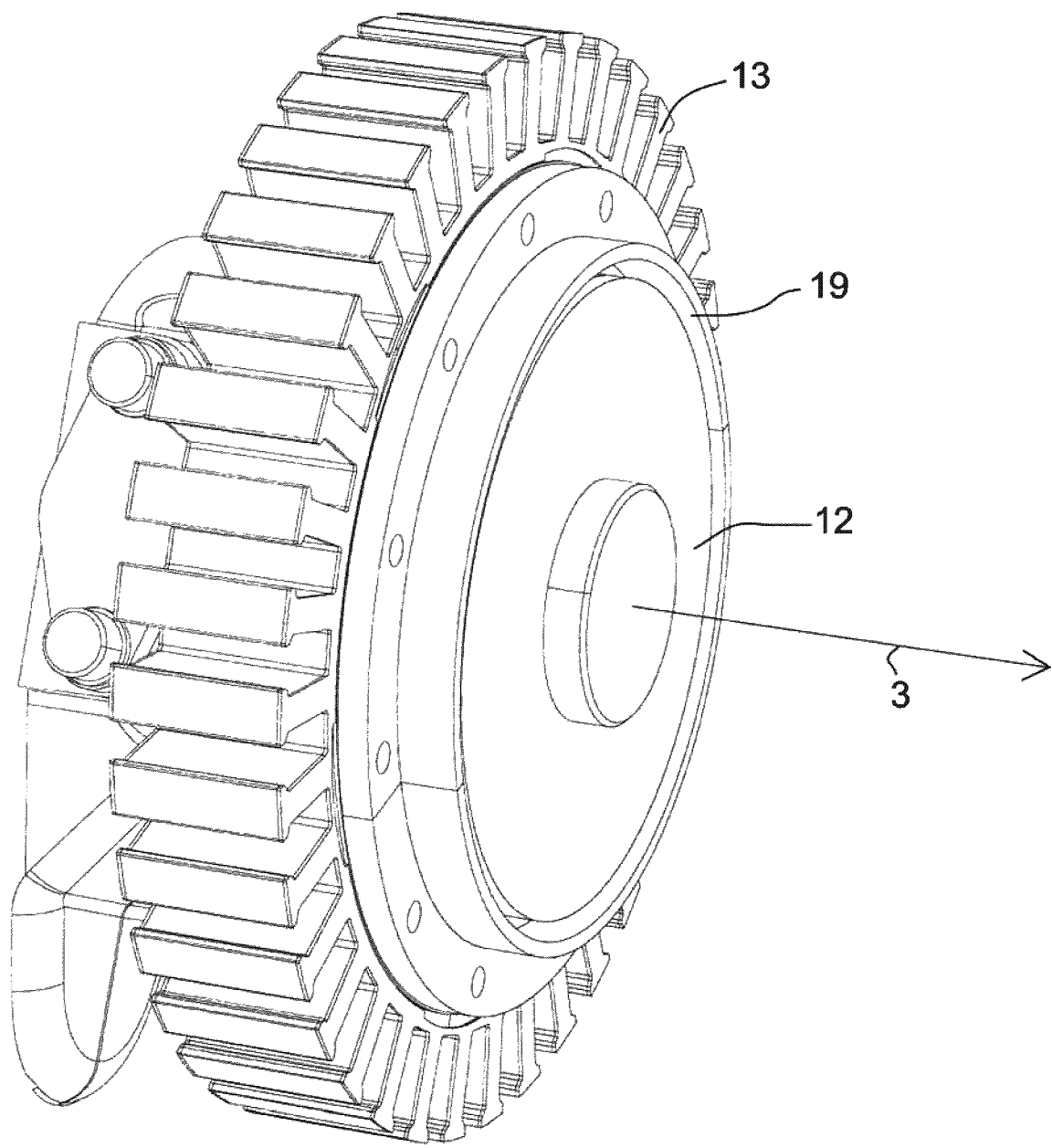
Figure 4:
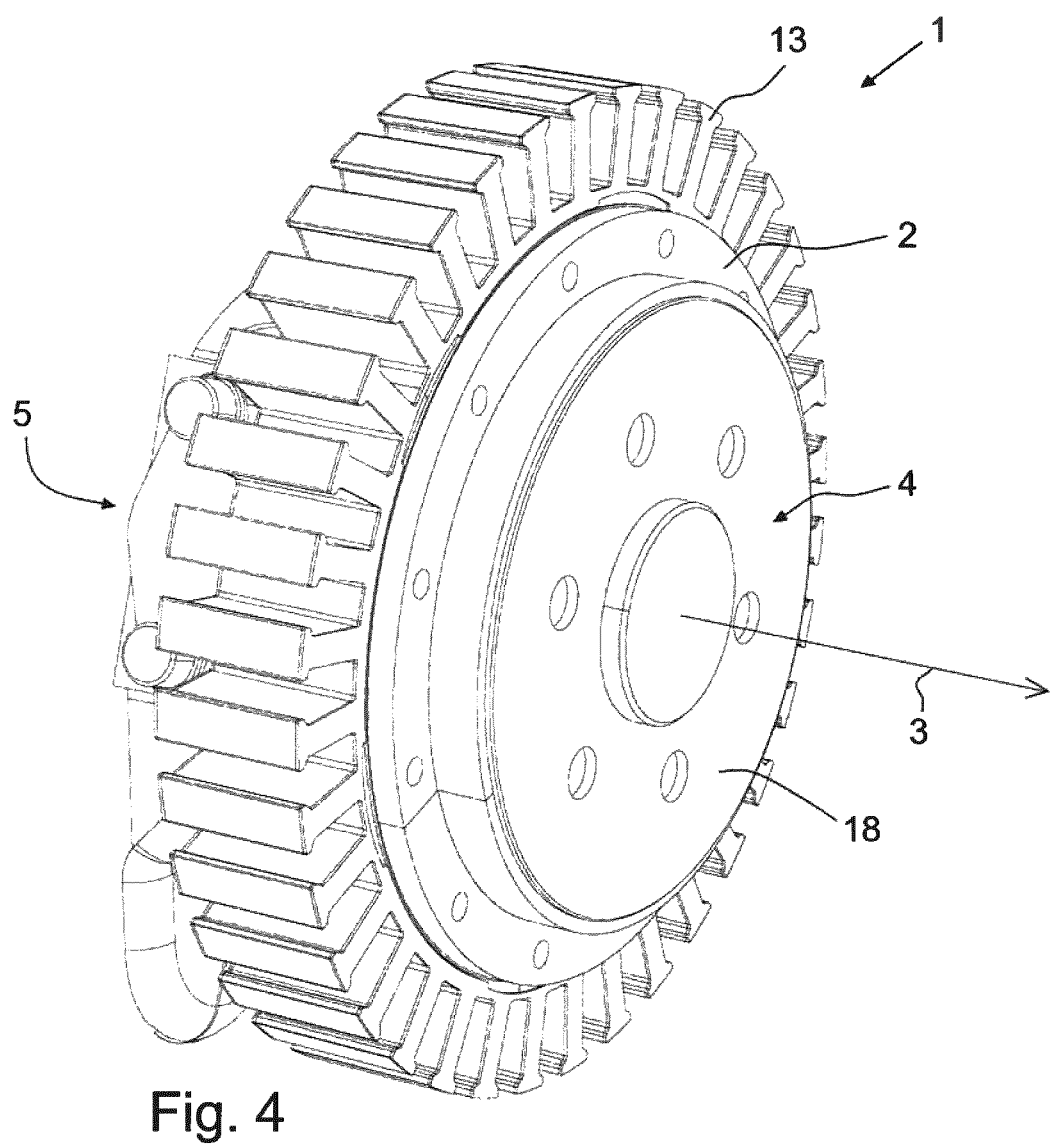
Figure 5:
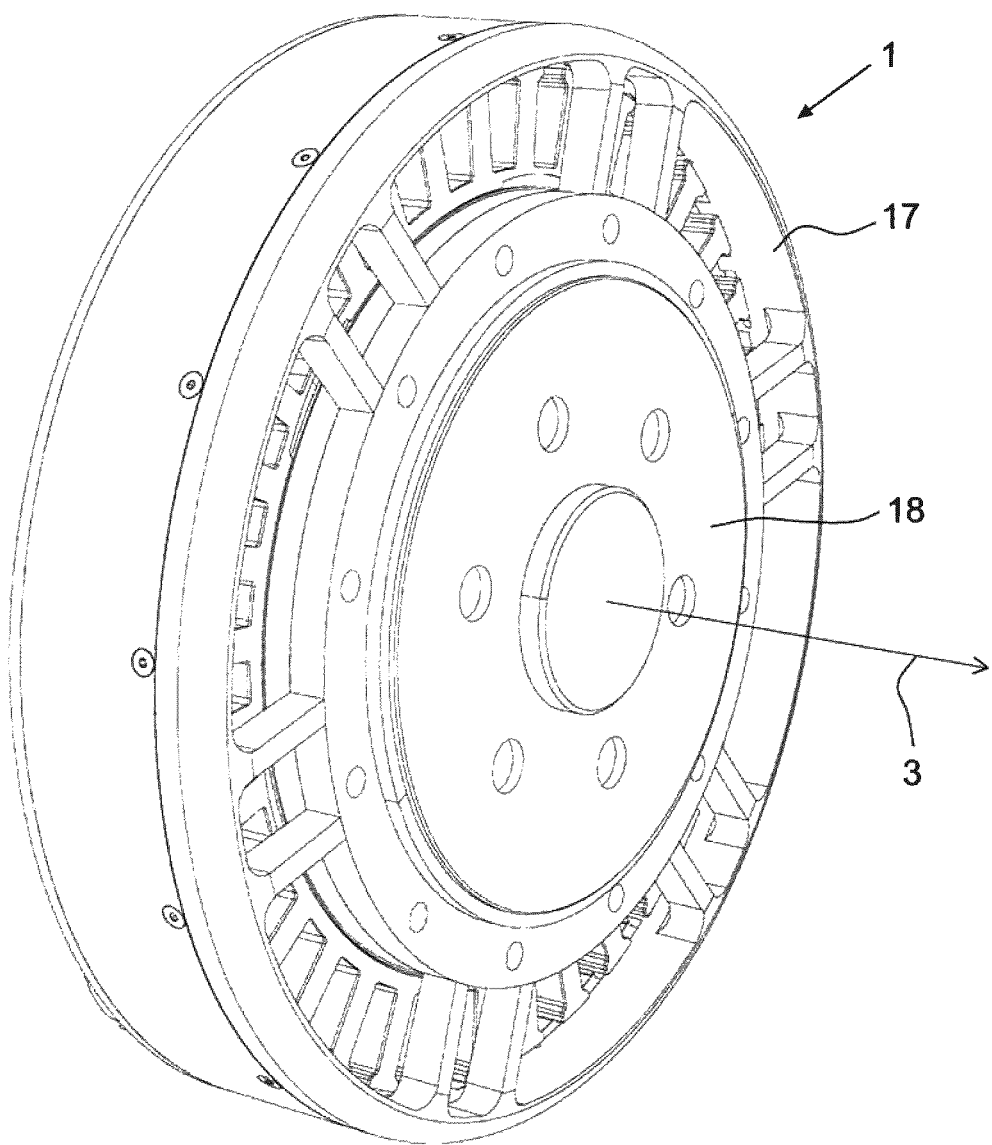
Figure 6:
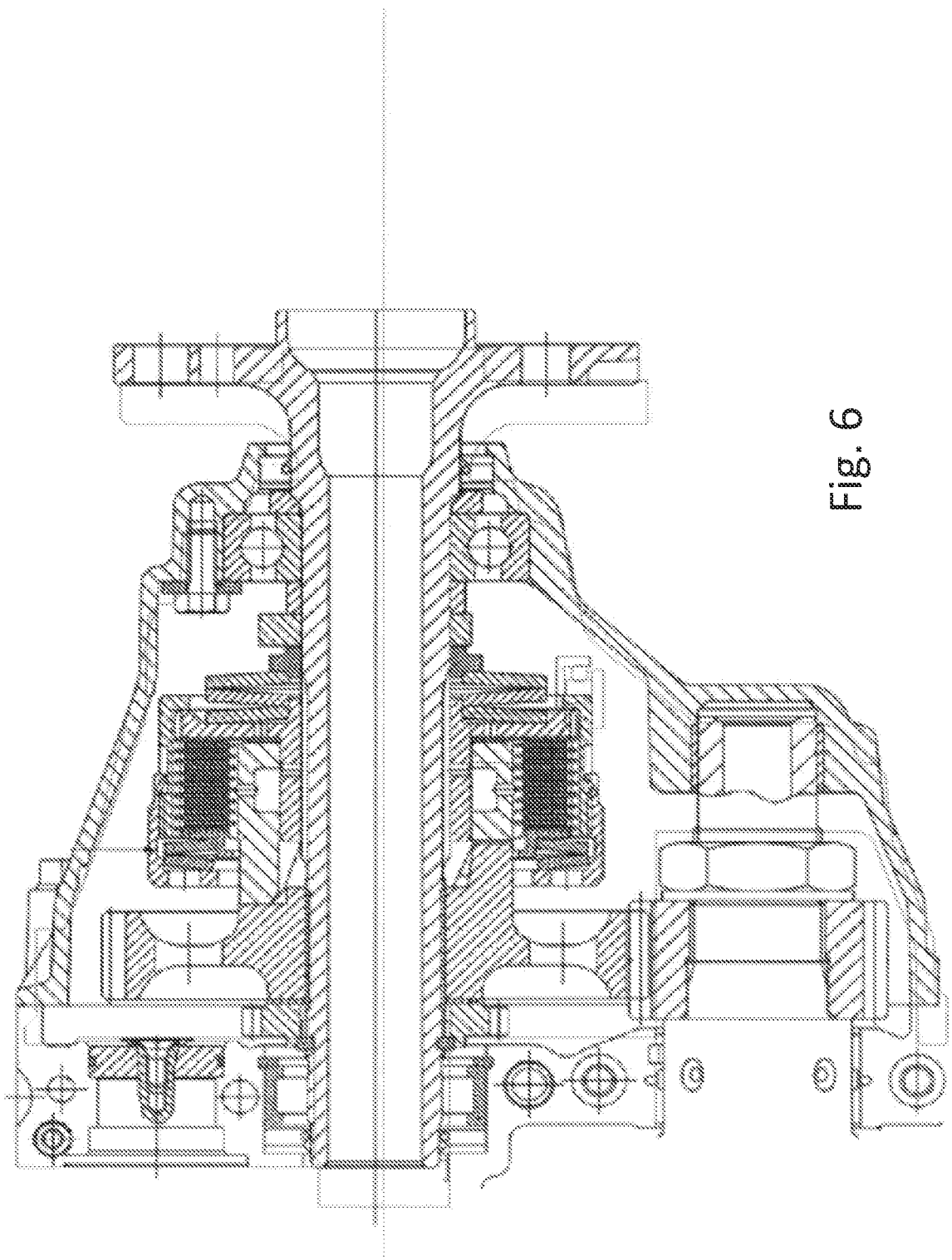
Figure 7:
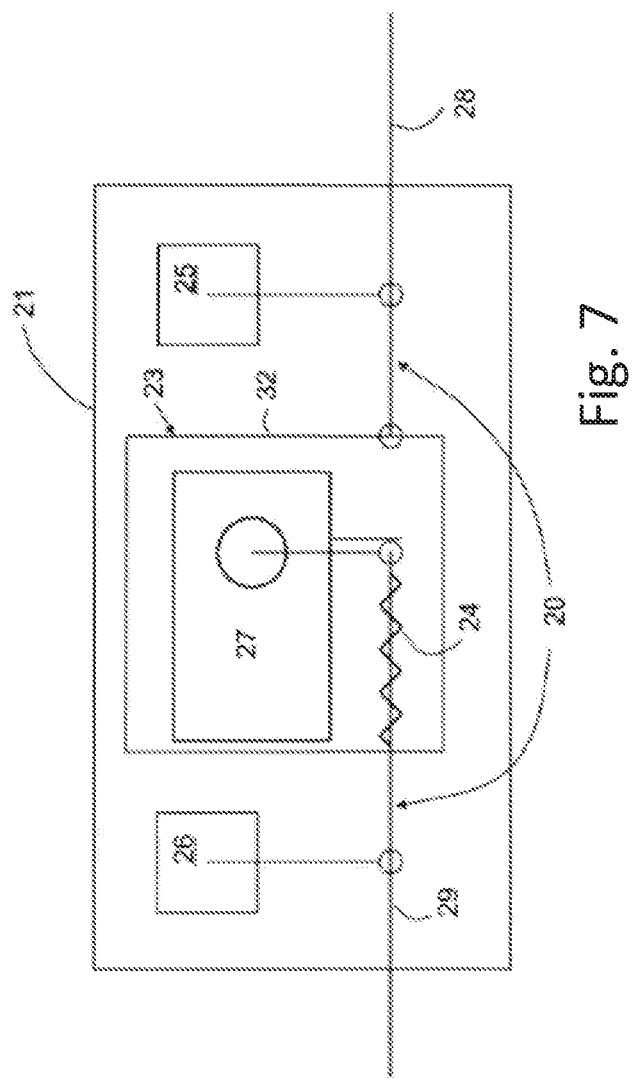
Figure 8:
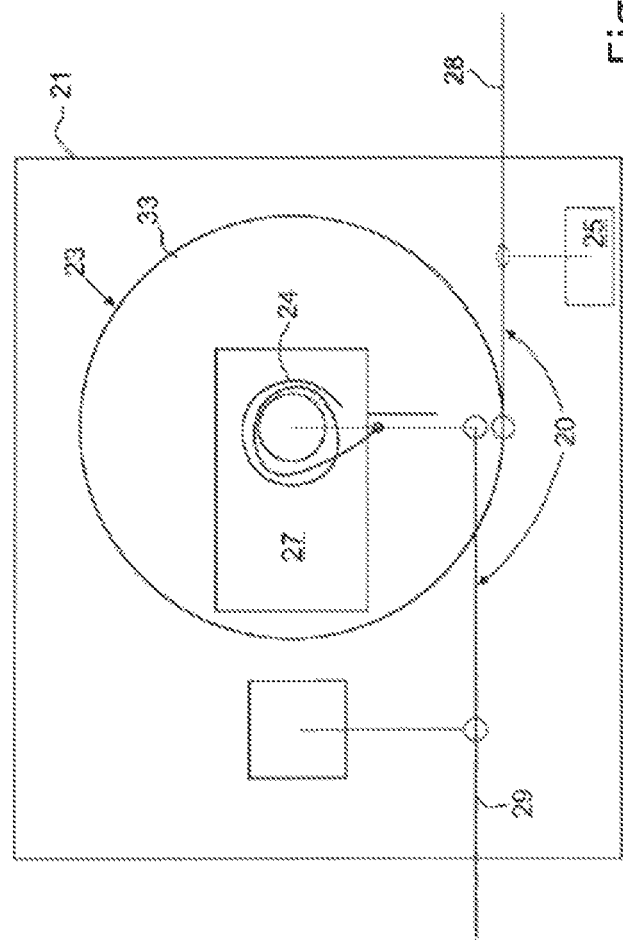
Figure 9:
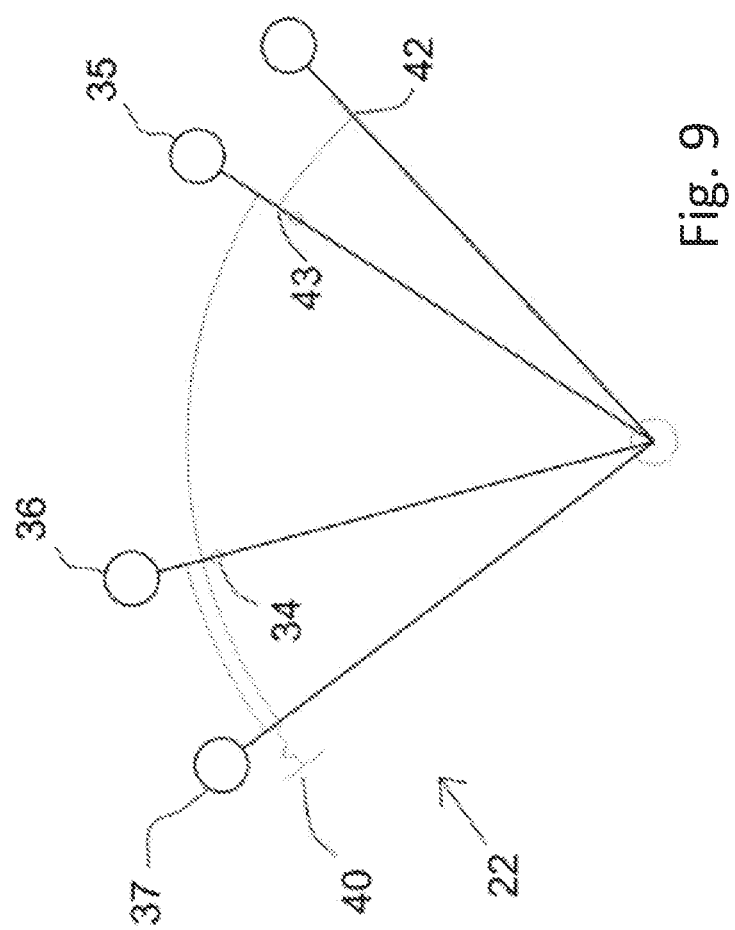
Figure 10:
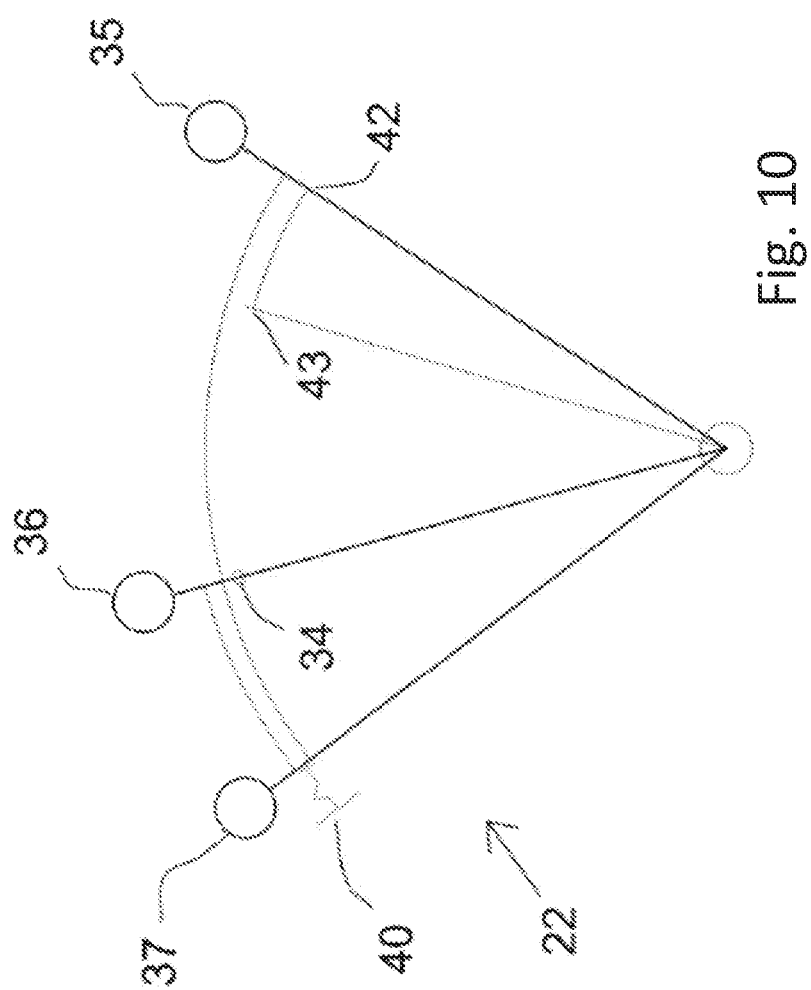
Figure 11:
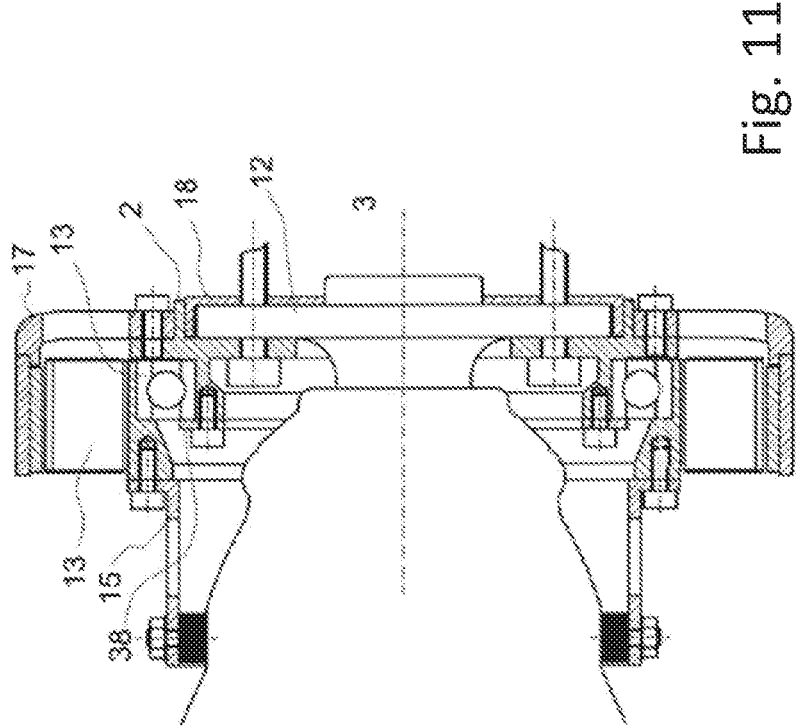
Figure 12:
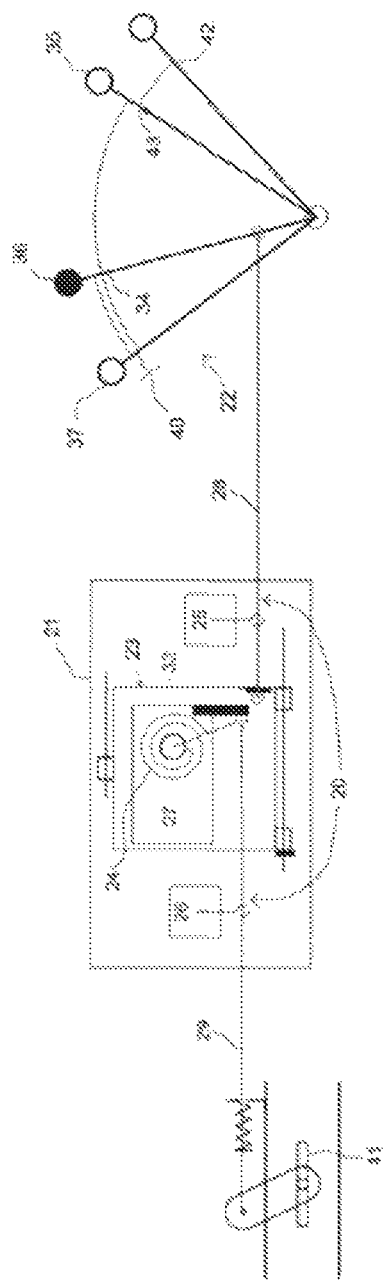
FIGS. 12 to 14 show an overview comprising the power lever and the power control system and the coupling element with a power lever side control connection, a motor side control connection and a throttle valve 41.
Figure 13:
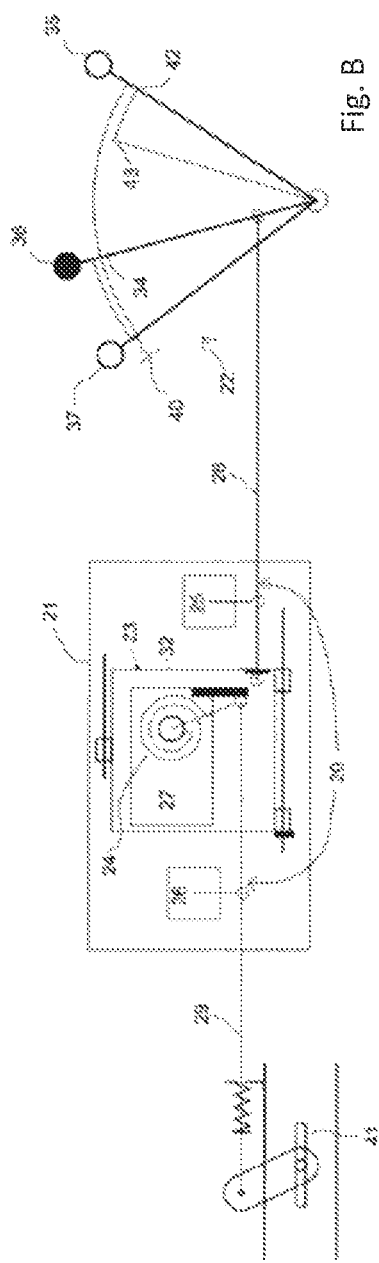
Figure 14:
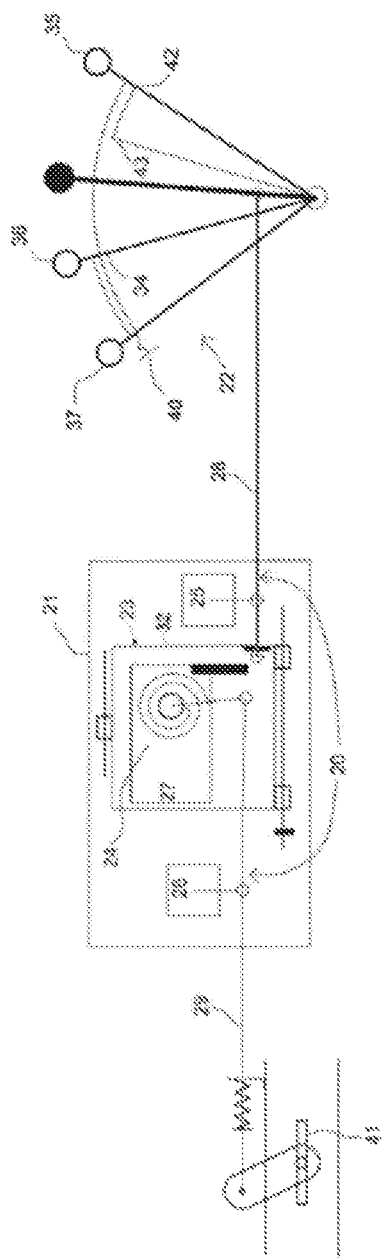

In FIG. 14, the power requirement on the part of the power lever 22 is withdrawn, and the servo unit of the coupling element increases the power requirement at the actual power lever position of the internal-combustion engine.

Also provided are methods according to the invention for mounting the electric motor and for operation of the power control system in accordance with the remarks made above.

LIST OF REFERENCE NUMBERS 1 electric drive
2 flange
3 axial direction
4 propeller side
5 motor side
6 bearing housing section
7 rotor bearing section
8 through hole
9 mounting section
10 through hole
11 mounting section
12 propeller flange
13 stator
14 bearing device
15 torque support
16 jacket wall
17 rotor
18 centering device
19 annular gap
20 control connection
power control system
power lever
23 coupling element
24 release device
25 power lever sensor
26 motor sensor
27 servo unit
28 power lever side control connection section
29 motor side control connection section
30 power lever device
31 shaft through opening
32 sliding carriage
33 rotary disc
34 release device
35 idling internal combustion engine
36 full throttle setting internal-combustion engine/idling electric drive
37 full throttle hybrid drive
38 axial fixing device
39 stop device
40 switch
41 throttle valve
42 full braking power
43 zero braking power

The invention claimed is:

1. An electric drive for an aircraft hybrid system comprising a rotor, a stator, wherein the stator connects to a structure of the aircraft and the rotor has an annular flange with a shaft through opening for mounting on a propeller flange, wherein one end face of the annular flange is described as a propeller side and another end face as a motor side, wherein a bearing housing section is formed on the motor side and a rotor bearing section is formed on the propeller side, and the stator has an annular bearing device and a torque support, wherein the bearing device is provided in the area of the bearing housing section of the annular flange and the rotor is fixed on the rotor bearing section of the annular flange, wherein reaction torque of the stator is delivered via the torque support to the structure of the aircraft, where the reaction torque is absorbed.

2. The electric drive according to claim 1, wherein the annular flange is formed of at least two parts, wherein each of the at least two parts of the annular flange delimits a section of the shaft through opening.

3. The electric drive according to claim 2, wherein a cup-shaped centering device is provided, which is designed for centering of the annular flange, and connects to a spigot of the propeller flange and a mounting section of the annular flange.

4. An aircraft hybrid system comprising
a propeller shaft with the propeller flange,
an electric drive according to claim 1, which is connected to the propeller flange, and an internal-combustion engine with crankshaft, wherein the propeller shaft is driven through the crankshaft.

5. The aircraft hybrid system according to claim 4, wherein the crankshaft of the internal-combustion engine connects to and disconnects from the propeller shaft via a clutch, wherein the clutch is in the form of a friction clutch.

6. The aircraft hybrid system according to claim 4, wherein a gearbox is provided between crankshaft and propeller shaft.

7. The electric drive according to claim 1, wherein the rotor has surrounding permanent magnets and is connected directly to the propeller flange, and thus transfers torque of an electric motor directly to a propeller.

8. The electric drive according to claim 1, wherein the bearing housing section and the rotor bearing section are roughly tubular in shape and the annular flange is roughly annular in shape.

9. The electric drive according to claim 1, wherein the structure of the aircraft is a static component of the aircraft.

10. The electric drive according to claim 1, wherein the structure of the aircraft is an engine housing, motor housing, gear housing, engine bearer, and/or engine mounting component of the aircraft.

11. The electric drive according to claim 1, wherein the annular bearing device of the stator is a roller bearing.

12. The electric drive according to claim 1, wherein the stator is rotatably mounted to the bearing housing section of the annular flange via the annular bearing device.

13. An electric drive for an aircraft hybrid system of an aircraft, the electric drive comprising:
a flange comprising a shaft through opening for mounting on a propeller flange, a bearing housing section formed on a motor side end face of the flange, and a rotor bearing section formed on a propeller side end face of the flange;

a rotor, which is mounted on a jacket wall of the rotor bearing section; and a stator comprising a bearing device and a torque support, wherein the bearing device is mounted on a jacket wall of the bearing housing section, and reaction torque is delivered to a structure of the aircraft via the torque support.

14. The electric drive according to claim 13, further comprising a centering device for centering the flange, wherein the centering device is connected to a spigot of the propeller flange and a mounting section of the flange.

15. The electric drive according to claim 13, wherein permanent magnets are arranged around the rotor, which is connected directly to the propeller flange and transfers torque of the electric driver directly to a propeller of the aircraft.

16. The electric drive according to claim 13, wherein the bearing housing section and the rotor bearing section are roughly tubular in shape and the flange is roughly annular in shape.

17. An electric drive for an aircraft hybrid system of an aircraft, the electric drive comprising:

a flange comprising a shaft through opening for mounting on a propeller flange, a bearing housing section formed on a motor side end face of the flange, and a rotor bearing section formed on a propeller side end face of the flange;

a rotor, which is mounted on a jacket wall of the rotor bearing section; and a stator comprising a bearing device and a torque support, wherein the bearing device is mounted on a jacket wall of the bearing housing section, and reaction torque is delivered to a structure of the aircraft via the torque support, wherein the flange comprises two parts, each of which delimits a section of the shaft through opening.

18. The electric drive according to claim 17, further comprising a centering device for centering the flange, wherein the centering device is connected to a spigot of the propeller flange and a mounting section of the flange.

\* \* \* \* \*